United States Patent
Kifuku (10) Patent No.: US 6,332,506 B1
(45) Date of Patent: *Dec. 25, 2001

(54) MOTOR DRIVEN POWER STEERING DEVICE

(75) Inventor: Takayuki Kifuku, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,173
(22) PCT Filed: Jun. 20, 1997
(86) PCT No.: PCT/JP97/02130
§ 371 Date: Feb. 10, 1999
§ 102(e) Date: Feb. 10, 1999
(87) PCT Pub. No.: WO98/58833
PCT Pub. Date: Dec. 30, 1998

(51) Int. Cl.$^7$ ..................................................... B62D 5/04
(52) U.S. Cl. ............................ 180/443; 701/43; 180/404
(58) Field of Search .................................. 180/443, 444, 180/446, 404; 71/41, 42, 43

(56) References Cited

U.S. PATENT DOCUMENTS

| | | |
|---|---|---|
| 4,532,567 | 7/1985 | Kade . |
| 4,547,715 | 10/1985 | Li . |
| 4,562,896 * | 1/1986 | Morishita et al. .................... 180/142 |
| 4,660,671 * | 4/1987 | Behr et al. ............................ 180/142 |
| 4,834,201 | 5/1989 | Miyazaki et al. . |
| 4,984,647 * | 1/1991 | Morishita et al. ................... 180/79.1 |
| 5,530,788 | 6/1996 | Saijima . |
| 5,552,684 | 9/1996 | Wada et al. . |
| 5,602,735 * | 2/1997 | Wada ............................ 364/424.051 |
| 5,677,839 * | 10/1997 | Kondo ........................... 364/424.034 |
| 5,889,376 * | 3/1999 | Takatsuka et al. .................... 318/434 |
| 5,912,539 * | 6/1999 | Sugitani et al. ...................... 318/434 |
| 5,927,430 * | 7/1999 | Mukai et al. ......................... 180/446 |

FOREIGN PATENT DOCUMENTS

| | | |
|---|---|---|
| 249 506 | 12/1987 | (EP) . |
| 282 594 | 9/1988 | (EP) . |
| 292566 | 11/1988 | (EP) . |
| 522 492 | 1/1993 | (EP) . |
| 60-209365 | 10/1985 | (JP) . |
| 63-148875 | 6/1988 | (JP) . |
| 3-96476 | 4/1991 | (JP) . |
| 4-31171 | 2/1992 | (JP) . |
| 92-12037 | 6/1992 | (JP) . |
| 4-317861 | 11/1992 | (JP) . |

(List continued on next page.)

Primary Examiner—Kenneth R. Rice
Assistant Examiner—Andrew J. Fisher
(74) Attorney, Agent, or Firm—Sughrue Mion, PLLC (57) ABSTRACT

An electric power steering apparatus includes a motor 1 which produces an auxiliary steering force in accordance with, for example, a steering torque detected by a torque sensor 7; a motor drive circuit 2 which controllably drives the motor 1; a power supply voltage detecting circuit 17 which detects the power supply voltage VB of the motor drive circuit 2; and a microcomputer 9. The microcomputer 9 detects terminal voltages VM+ and VM− of the motor 1 when the power supply voltage detecting circuit 17 determines that the power supply voltage AB is higher than a predetermined value. Then, the microcomputer 9 makes a decision to determine whether the detected terminal voltages VM+ and VM− are not predetermined values VTHH and VTHL, respectively. If it is determined that the terminal voltages VM+ and VM− are not the predetermined values VTHH and VTHL, respectively, then the microcomputer 9 determines that a fault has occurred on the lines connected to the motor 1.

14 Claims, 10 Drawing Sheets

FOREIGN PATENT DOCUMENTS

| | | |
|---|---|---|
| 5-185937 | 7/1993 | (JP) . |
| 6-298104 | 10/1994 | (JP) . |
| 7-149247 | 6/1995 | (JP) . |
| 8-47296 | 2/1996 | (JP) . |
| 8-133107 | 5/1996 | (JP) . |
| 8-310418 | 11/1996 | (JP) . |

* cited by examiner

1. CONTINUOUS CURRENT MODE

2. INTERMITTENT CURRENT MODE

SINGLE PWM DRIVE METHOD
(12b AND 12c ARE OFF)

FIG. 3

1. CONTINUOUS CURRENT MODE

2. INTERMITTENT CURRENT MODE

DOUBLE PWM DRIVE METHOD
(12b AND 12c ARE OFF)

GROUND FAULT OCCURS

FIG. 7

CLOSED CIRCUIT FAULT OCCURS

FIG. 9

CLOSED CIRCUIT FAULT AND
GROUND FAULT WHILE MOTOR IS
BEING DRIVEN

PRIOR ART

MOTOR DRIVEN POWER STEERING DEVICE

TECHNICAL FIELD

The present invention relates to an electric power steering apparatus which detects a ground fault of a motor and a short circuit fault between the motor and the power supply (referred to "closed circuit fault" hereinafter), the motor producing auxiliary steering force to assist a driver in steering. The electric power steering apparatus performs the detection of the faults without false detections due to the back electromotive force and regenerative current of the motor, and subsequently performs a fail-safe operation.

BACKGROUND ART

Figure 12:
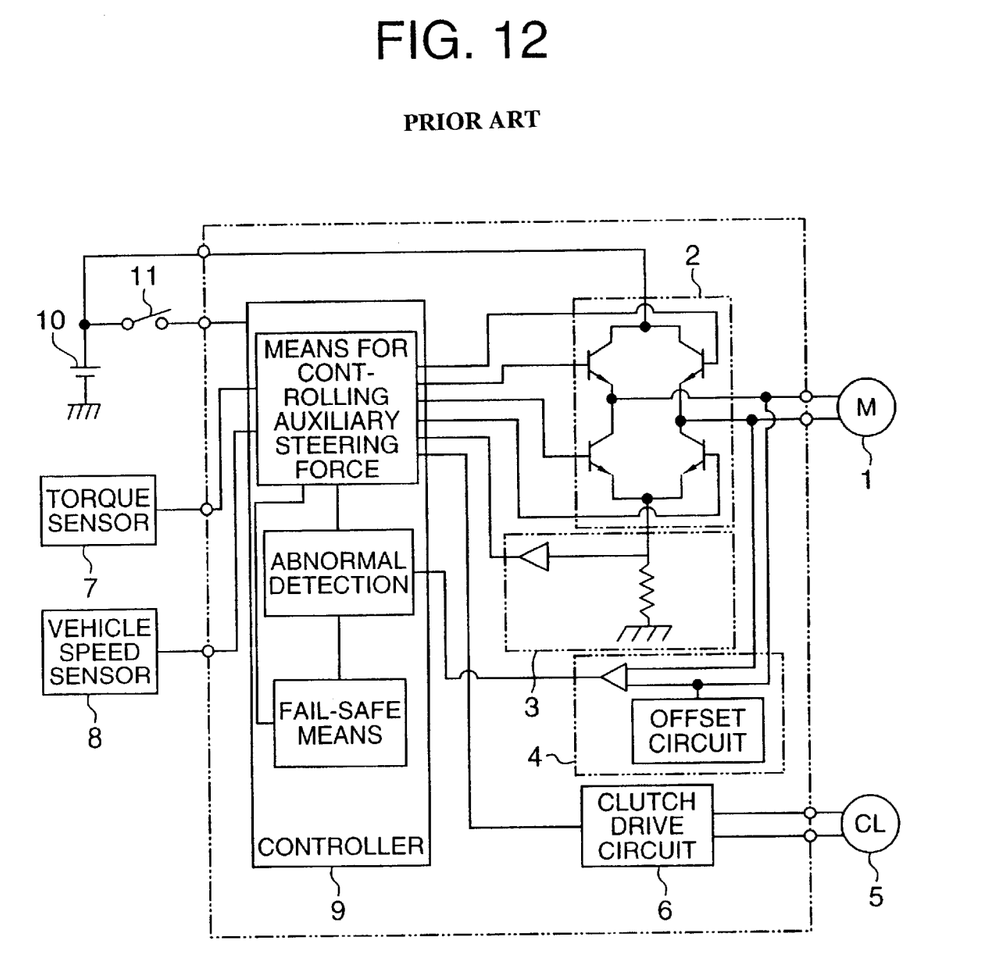
FIG. 12 illustrates a conventional electric power steering apparatus.

FIG. 12 illustrates a conventional electric power steering apparatus disclosed in, for example, Japanese Patent Application Laid-Open No. 4-31171. A motor 1 that generates an auxiliary steering force is controllably driven by a motor drive circuit 2. The motor drive circuit 2 is in the form of an H-bridge circuit using power transistors. The current flowing through the motor 1 is detected by a motor current detecting circuit 3. The voltage across the terminals of the motor 1 is detected by a motor terminal voltage detecting circuit 4.

A clutch 5, which mechanically disconnects the motor 1 from a steering shaft, is driven by a clutch drive circuit 6.

A torque sensor 7 detects the steering force applied by a driver and a vehicle speed sensor 8 detects the cruising speed of the vehicle.

A microcomputer 9 reads the outputs of the torque sensor 7, vehicle speed sensor 8, and others. The microcomputer 9 controls the motor 1 such that the motor 1 generates an optimum auxiliary steering force in accordance with the driving conditions, and detects the line faults on the basis of the outputs of the motor terminal voltage detecting circuit 4 and others. The power supply voltage from a battery 10 is supplied to the motor 1 via the motor drive circuit 2 and to the microcomputer 9 via an ignition switch 11.

The operation of the conventional apparatus will be described. When the driver throws the ignition switch 11 to the ON position, the microcomputer 9 receives electric power and reads the outputs of the torque sensor 7 and vehicle speed sensor 8. In accordance with the cruising conditions of the vehicle and the steering operation performed by the driver, the microcomputer 9 computes an optimum auxiliary steering force that the motor 1 should generate.

The motor 1 is a DC motor where the output torque is proportional to the motor current. Therefore, the motor current indicates the generated auxiliary steering force. Thus, the computed steering force is equivalent to a target current that should be supplied to the motor 1.

The microcomputer 9 reads the motor current detected by the motor current detecting circuit 3, and performs feedback-controlling the motor 1 such that the detected motor current becomes equal to the target current of the motor 1, thereby computing a voltage that should be applied to the motor 1. Then, the microcomputer 9 sends the computed voltage to the motor drive circuit 2 to drive the motor 1.

Meanwhile, the motor terminal voltage detecting circuit 4 detects the voltage across the terminals of the motor 1. The microcomputer 9 compares the computed voltage (target voltage) with the detected voltage. If the difference between the target voltage and the detected voltage remains larger than a predetermined value for a time period longer than a predetermined value, then it is determined that a line fault has occurred.

For example, when the detected voltage is lower than the target voltage, if the difference between the two voltages exceeds a predetermined value and lasts longer than a predetermined time length, it is determined that, for example, a ground fault has occurred on the power line(s) connected to the motor 1.

However, the motor 1 generates a voltage (back electromotive force) proportional to its rotational speed. When the motor 1 is energized to rotate, the back electromotive force causes a difference between the target voltage and the detected voltage even though the steering apparatus is operating normally, there being a possibility of the microcomputer 9 performing an erroneous detection of line faults.

An electric power steering apparatus may encounter a case where the motor 1 is not supplied with electric power but is driven in rotation by its load, i.e., the rotational force of tires. For example, when the vehicle is running with the steering wheel rotated through a given angle, if the driver moves his hands off the steering wheel, the tires return to their neutral positions (self-aligning torque), causing the steering wheel to return to its neutral position so that the motor 1 rotates to generate a back electromotive force independently of the target voltage.

Such a case may occur frequently, and even if the target voltage is zero volts, a voltage due to the back electromotive force appears across the terminals and is detected. Therefore, conventional methods of detecting the line faults of an electric power steering apparatus are highly apt to detect erroneous faults. Thus, a false detection of line faults will occur frequently if a line fault in the electric power steering apparatus is to be detected in terms of the difference between the target voltage and the detected voltage. Such a frequent false detection is detrimental.

When taking some measure to prevent such a false detection, it is necessary to allow, for example, a very long time from the detection till it is determined that a line fault has actually occurred and a fail-safe operation is carried out subsequently. However, this is detrimental since such a long time impairs the ability to detect line faults.

As mentioned above, with a conventional electric power steering apparatus, the conventional fault-detecting methods including the aforementioned method suffer from a drawback that the back electromotive force of the motor 1 causes frequent false detections of line faults if a fault of the motor 1 is to be detected in terms of the terminal voltages.

The present invention was made to solve the aforementioned drawbacks. An object of the invention is to provide an electric power steering apparatus where faults such as a ground fault of the power lines connected to the motor can be detected without false detections due to, for example, the back electromotive force of the motor.

DISCLOSURE OF THE INVENTION

The present invention has a motor that provides an auxiliary steering force in accordance with, for example, a detected steering torque, motor drive/control means that controllably drives the motor, and fault determining means which determines a fault to have occurred if voltages on the respective terminals of the motor are not predetermined values. Thus, the invention can detect line faults such as a closed circuit fault and a ground fault of the motor, there being no possibility of false detection due to a back electromotive force of the motor.

The fault determining means of the present invention includes a motor terminal average voltage monitor which smooths out the square-shaped terminal voltages appearing on the terminals of the pulse-driven motor and detects average motor terminal voltages. The fault determining means determines a fault to have occurred if the motor terminal average voltages are not predetermined values, thus alleviating the load on the microcomputer when determining the fault with the motor 1 driven.

The fault determining means according to the present invention is provided with a motor terminal voltage monitor that adds a predetermined voltage to the motor terminal voltages, thereby detecting a ground fault without the motor driven.

In the invention, a fault detection operation is performed on the basis of the motor terminal voltages only when the motor is deenergized longer than a predetermined minimum time, thereby ensuring detection of a closed circuit fault and a ground fault of the motor circuit. There is no possibility of a false detection due to a regenerative current of the motor.

In the present invention, a fault detection operation is not performed on the basis of the motor terminal voltages during energization of the motor if the voltages applied to the motor is below predetermined values, thereby ensuring detection of a closed circuit fault or a ground fault of the motor. There is no possibility of a false detection due to a regenerative current.

Further, in the present invention, a fault detection operation is not performed on the basis of the motor terminal voltages during energization of the motor if the motor current is equal to or less than a predetermined value, thereby ensuring detection of a closed circuit fault or a ground fault of the motor. There is no possibility of a false detection due to a regenerative current.

Further, in the present invention, a fault detection operation is performed based on the motor terminal voltages only when the supply voltage of the motor drive/control means is within a predetermined range, thereby ensuring the detection of a closed circuit fault or a ground fault of the motor. There is no possibility of a false detection due to return diodes.

When a fault is determined to have occurred in the present invention, the energization of the motor is stopped, thereby ensuring the protection of components used in the motor drive circuit.

Further, in the present invention, an alarm device is provided which warns of the driver of a fault when the fault is determined to have occurred.

When a fault is determined to have occurred in the present invention, the motor is mechanically disconnected from the steering system, thereby preventing increases in steering force due to the generator brake of the motor if a quick steering is performed.

Further, the present invention, a switch means is provided between the motor drive/control means and the power supply or between the motor/drive control means and the ground so as to open the current path when a fault is determined to have occurred, thereby shutting down the current even if the motor drive circuit is short-circuited.

Further, the present invention, a switch means is provided in the closed circuit formed of the motor drive/control means and its load. The switch means is opened to prevent the generator brake of the motor due to the fault when a fault is determined to have occurred.

Further, the present invention, a clutch means is provided which drivingly couples the motor to the steering system.

The clutch means mechanically disconnects the motor from the steering system when a fault is determined to have occurred, thereby preventing increases in steering force due to the generator brake of the motor when the vehicle is steered quickly.

BEST MODE FOR CARRYING OUT THE INVENTION

Figure 1:
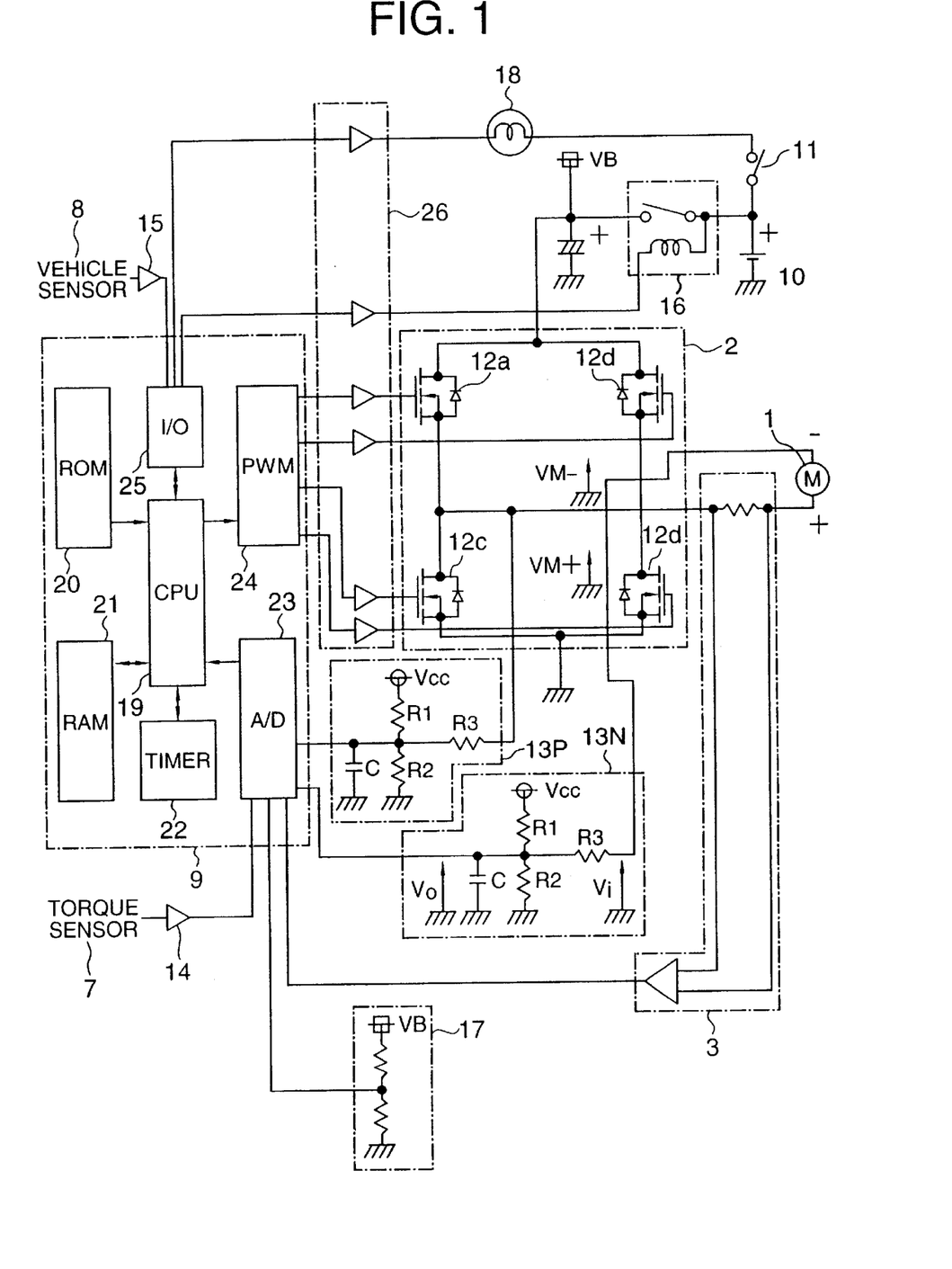
FIG. 1 illustrates an electric power steering apparatus according to Embodiment 1 of the invention.

The present invention will be described in detail with reference to the accompanying drawings.
Embodiment 1:

Embodiment 1 will be described with reference to the figures. Elements similar to those in the conventional apparatus have been given the same or similar references. Referring to FIG. 1, a motor drive circuit 2 drives a motor 1 which provides an auxiliary steering force. The motor drive circuit 2 is in the form of an H-bridge circuit that includes MOS-FETs 12a–12d. The current flowing through the motor 1 is detected by a motor current detecting circuit 3 and is input to a microcomputer 9. Motor terminal voltage detecting circuits 13P and 13N have their input terminals connected to positive and negative terminals of the armature, respectively, and detect the terminal voltages of the motor 1. The detected terminal voltages are input to the microcomputer 9.

The steering force applied by the driver is detected by a torque sensor 7 and a detection signal is input to the microcomputer 9 via a torque sensor inputting circuit 14, so as to control the motor 1 to generate an optimum auxiliary steering force in accordance with the vehicle conditions. A vehicle speed sensor 8 detects the cruising speed of the vehicle and sends a speed signal to the microcomputer 9 via a vehicle speed sensor inputting circuit 15. The motor drive circuit 2 receives its power supply voltage from a battery 10 via a power supply relay 16 which switches on and off the power supply voltage. A power supply voltage detecting circuit 17 detects the power supply voltage VB for the motor drive circuit 2 and sends a detection signal to the microcomputer 9.

When the microcomputer 9 determines from the received detection signals that there exists some fault, the microcomputer 9 warns the driver of the fault using an alarm lamp 18.

The microcomputer 9 includes a CPU 19, ROM 20, RAM 21, timer 22, motor current detecting circuit 3, motor terminal voltage detecting circuits 13P and 13N, A/D converter 23, PWM timer 24, and I/O port 25. The CPU 19 performs a fault determining operation, control/computation operations, and other operations based on the signals received from the respective detecting circuits. The ROM 20 stores, for example, various programs and the RAM 21 temporarily stores operational results and input data. The timer 22 is used to count time intervals at which the programs should be called. The A/D converter 23 receives the outputs of the torque sensor 7 via the buffer 14, converts the received outputs into digital signals, and sends the digital signals to the CPU 19. The PWM timer 24 drives the motor 1 at an appropriate duty cycle in accordance with the instruction received from the CPU 19. The CPU 19 outputs drive signals via the I/O port 25 and the buffer 26 to the power supply relay 16 and the alarm lamp 18. The CPU 19 receives the output of the vehicle speed sensor 8 via the buffer 15 and then through the I/O port 25.

The operation of Embodiment 1 will now be described. The electric power steering apparatus operates in the same way as in the conventional apparatus. In accordance with the detection signals of the torque sensor 7, vehicle speed sensor 8, and motor current detecting circuit 3, the microcomputer 9 instructs the motor drive circuit 2 to drive the motor 1 so that the motor 1 outputs an optimum auxiliary steering force.

Next, the behavior of the motor terminal voltages will now be described. An electric power steering apparatus requires that a current of several tens amperes flows through the motor 1. In order to suppress heat generation in the motor drive circuit 2, the motor 1 is pulse-driven. Therefore, the motor current will be described with respect to a case where the motor is driven in the PWM drive method.

Figure 2:
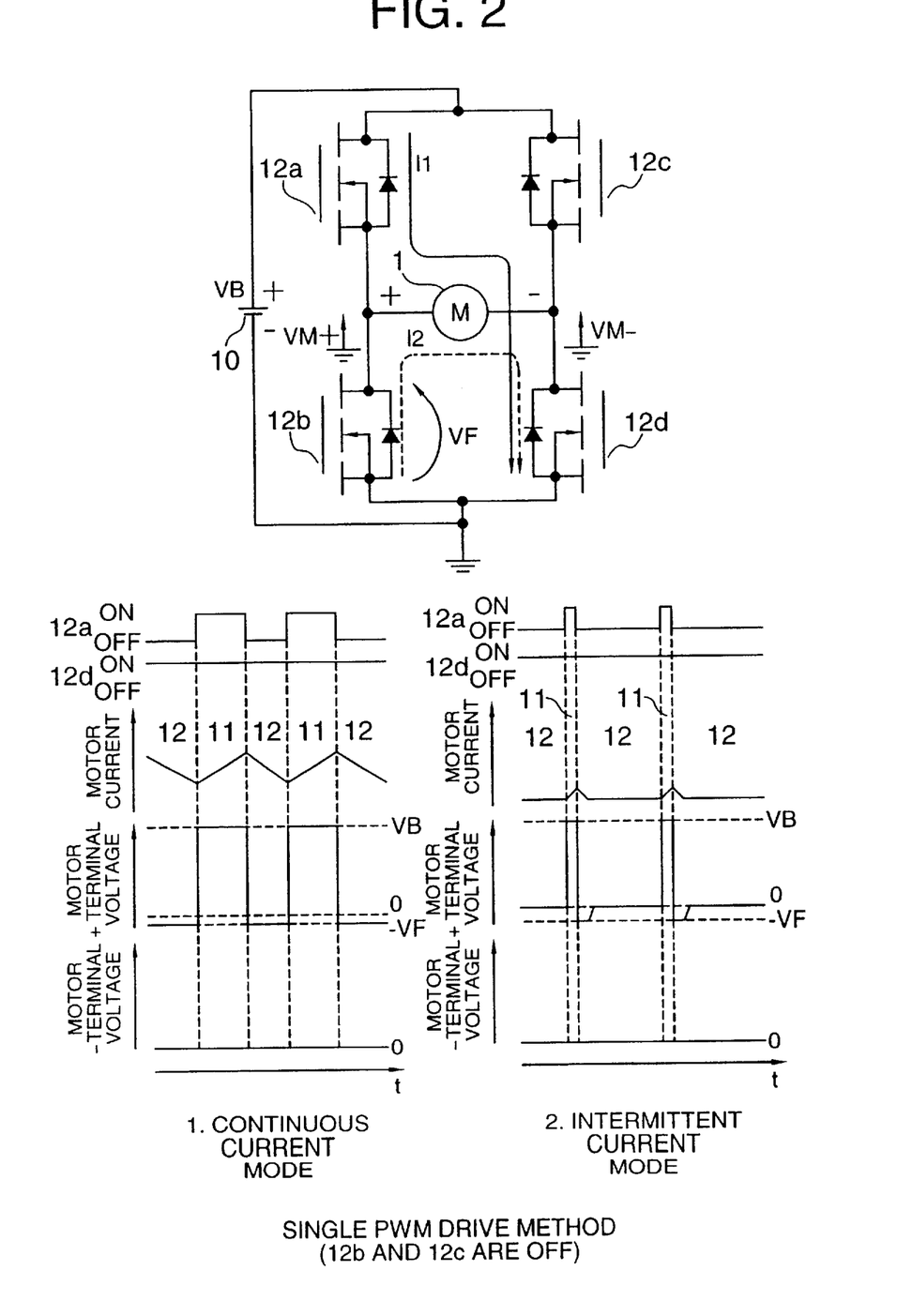
FIG. 2 illustrates the waveforms of various parts when the motor is driven in a single PWM drive method.
Figure 3:
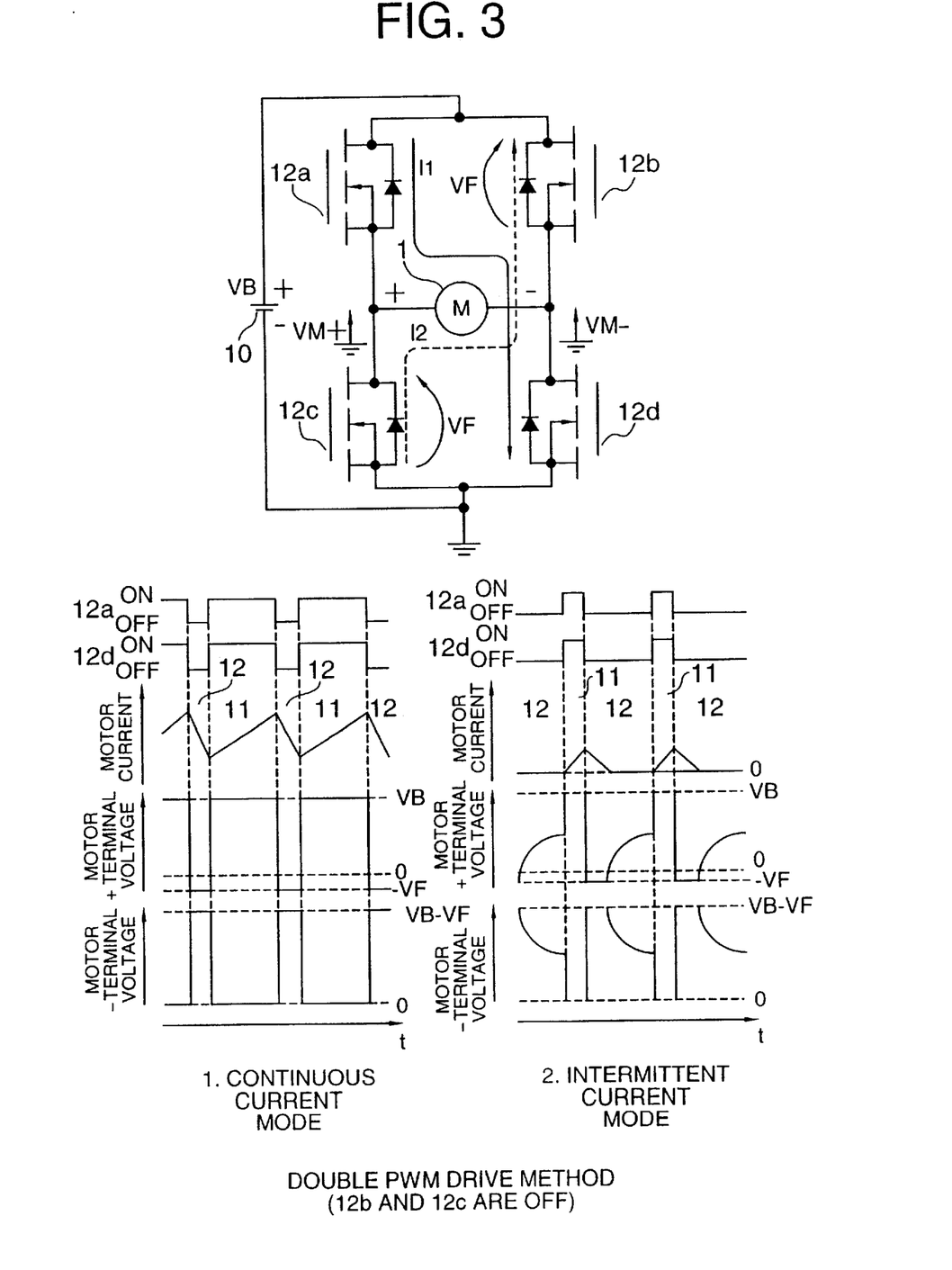
FIG. 3 illustrates the waveforms of various parts when the motor is driven in a double PWM drive method.

In order to drive the motor 1 to rotate in any of the forward and reverse directions, the motor drive circuit 2 can take the form of an H-bridge circuit including switching elements such as MOSFETs and the voltages applied to the motor 1 are switched in the PWM drive method. The switching elements can be switched in one of two known switching methods: a single PWM drive method as shown in FIG. 2 where one MOSFET either in the supply side or in the ground side is switched and the other MOSFET remains ON at all times, and a double PWM drive method as shown in FIG. 3 where the MOSFETs in the supply side and the MOSFET in the ground side are both switched. The single PWM drive method and double PWM drive method are described with reference to the respective figures.

FIG. 2 illustrates the waveforms of the motor terminal voltages when the motor 1 is driven in the single PWM drive method. With reference to FIG. 2, the operation will be described with respect to a case where a current flows from the positive terminal of the motor 1 to the negative terminal. The CPU 19 instructs the PWM timer 24 based on the results of the predetermined computations so as to drive the MOSFET 12a at a duty cycle corresponding to a voltage that should be applied to the motor 1, the MOSFETs 12b and 12c at a duty cycle of 0%, and the MOSFET 12d at a duty cycle of 100%. Then, a motor current flows through a current path I1 shown in FIG. 2.

A regenerative current flows in a current path I2 shown in FIG. 2 through the motor 1 during a time period from when the MOSFET 12a is turned off till the MOSFET 12a is subsequently turned on. If the regenerative current is consumed to zero primarily by the resistance in the armature windings, i.e., when the duty cycle is low, the motor current is intermittently supplied to the motor (intermittent current mode). When the duty cycle is high, the motor current is supplied continuously (continuous current mode).

If the rotational speed of the motor 1 is sufficiently low so that the back electromotive force of the motor 1 can be ignored and the on-resistances of the MOSFETs 12 are small enough so that the drain-to-source voltages can be assumed to be nearly zero, then the terminal voltages VM+ and VM− of the motor 1 with respect to the ground potential vary as shown in FIG. 2.

The operation will be described in order. The voltage VM+ is as high as the voltage of the battery 10 while the MOSFET 12a remains ON, so that VM+=VB. When the MOSFET 12a becomes OFF, the parasitic diode of the MOSFET 12c is turned on to operate as a return diode with the result that VM+=−VF (VF is a forward voltage drop of the parasitic diode).

Thereafter, in the intermittent current mode, the parasitic diode of the MOSFET 12c becomes OFF when the MOSFET 12a is OFF, and therefore VM+ approaches zero asymptotically. In the continuous current mode, the parasitic diode of the MOSFET 12c becomes ON when the MOSFET 12a is OFF, and VM+ remains VM+=−VF. The VM− is zero regardless of whether the MOSFET 12a is ON or OFF.

FIG. 3 illustrates the waveforms of the terminal voltages of the motor 1 when the motor 1 is driven in the double PWM drive method. In this case, too, the operation will be described with respect to a case where a current flows through the motor 1 from the positive terminal of the motor 1 to the negative terminal. The CPU 19 instructs the PWM timer 24 based on the results of the predetermined computational operations so as to drive the MOSFETs 12a and 12d at a duty cycle corresponding to a voltage that should be applied to the motor 1, and the MOSFETs 12b and 12c at a duty cycle of 0%. Then, currents flow in the current paths I1 and I2 shown in FIG. 3.

There are also an intermittent current mode and a continuous current mode in the double PWM drive method. The VM+ and VM− in the respective modes will change as shown in FIG. 3. The operation will be described in order. In the continuous current mode, the VM+ is as high as VB when the MOSFETs 12a and 12d are ON. When the MOSFETs 12a and 12d become OFF, the parasitic diodes of the MOSFETs 12b and 12c become ON to operate as a return diode and therefore the VM+ is −VF.

Thereafter, in the intermittent current mode, the parasitic diodes of the MOSFETs 12b and 12c become OFF when the MOSFETs 12a and 12d are OFF, so that the VM+ approaches VB/2 asymptotically. In the continuous current mode, the parasitic diodes of the MOSFETs 12b and 12c are ON when the MOSFET 12a remains OFF, so that VM+=−VF.

Meanwhile, the VM− is equal to zero when the MOSFETs 12a and 12d remain ON. When the MOSFETs 12a and 12d become OFF, the parasitic diodes of the MOSFETs 12b and 12c become ON to operate as a return diode with the result that VM−=VB−VF. Thereafter, in the intermittent current mode, the parasitic diodes of the MOSFETs 12b and 12c become OFF when the MOSFETs 12a and 12d are OFF, so that VM− approaches about VB/2 asymptotically. In the continuous current mode, the parasitic diodes of the MOSFETs 12b and 12c are ON while the MOSFET 12a remains OFF, so that VM− remains VB−VF.

Figure 4:
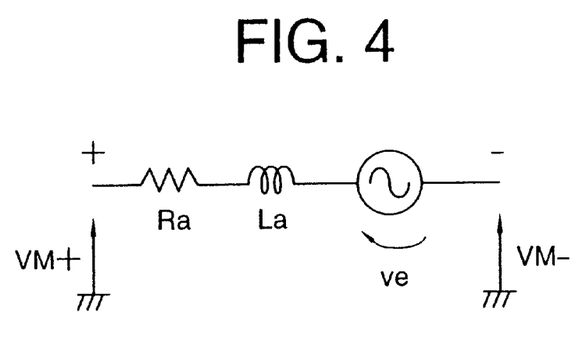
FIG. 4 shows an equivalent circuit of the motor.
Figure 5:
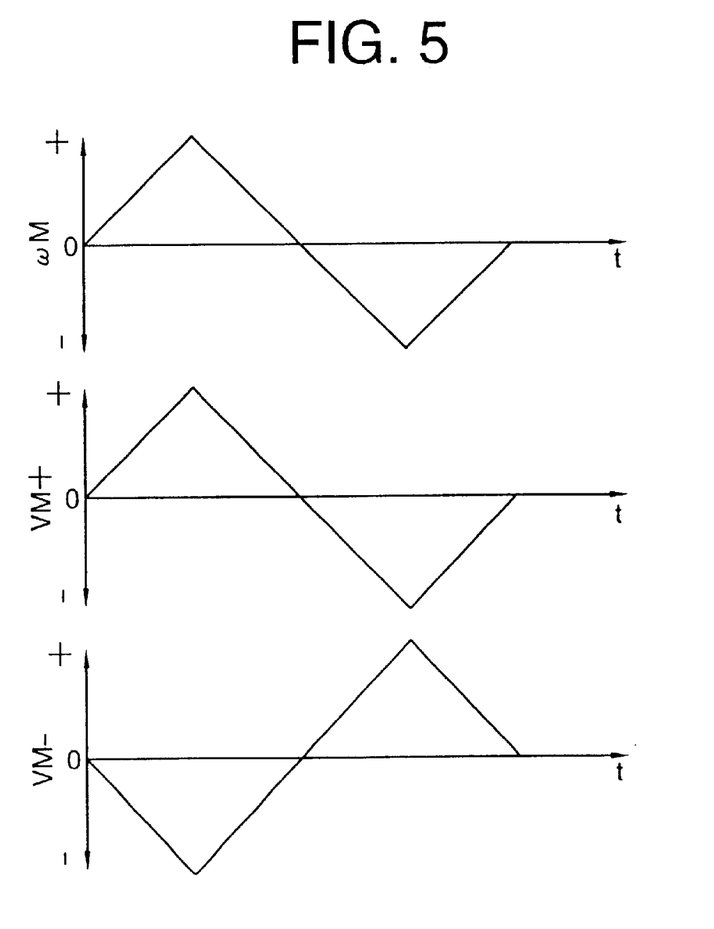
FIG. 5 illustrates the waveforms of various parts when the motor runs to generate a back electromotive force.

Next, the operations when the motor 1 runs will now be described. FIG. 4 illustrates an equivalent circuit of a DC motor where Ra is an armature resistance, La is an armature inductance, and ve is a back electromotive force. The back electromotive force ve is proportional to the rotational speed of the motor 1. FIG. 5 shows the rotational speed ωM of the motor 1 and the voltages VM+ and VM− appearing on the positive and negative terminals, respectively, due to the back electromotive force ve, the rotational direction being assumed to be a forward direction when a current flows from the positive terminal to the negative terminal.

When the motor 1 runs, the back electromotive force ve shown in FIG. 4 is superimposed on the voltages applied to the motor by the motor drive circuit 2. Therefore, the target voltage specified by the microcomputer 9 does not become equal to the voltage across the terminals of the motor 1. Especially, in the situation where the motor 1 is driven in rotation by a load, i.e., the tires, a voltage equal to the back electromotive force will appear on the terminals of the motor 1 even if the target voltage is zero volts.

Figure 6:
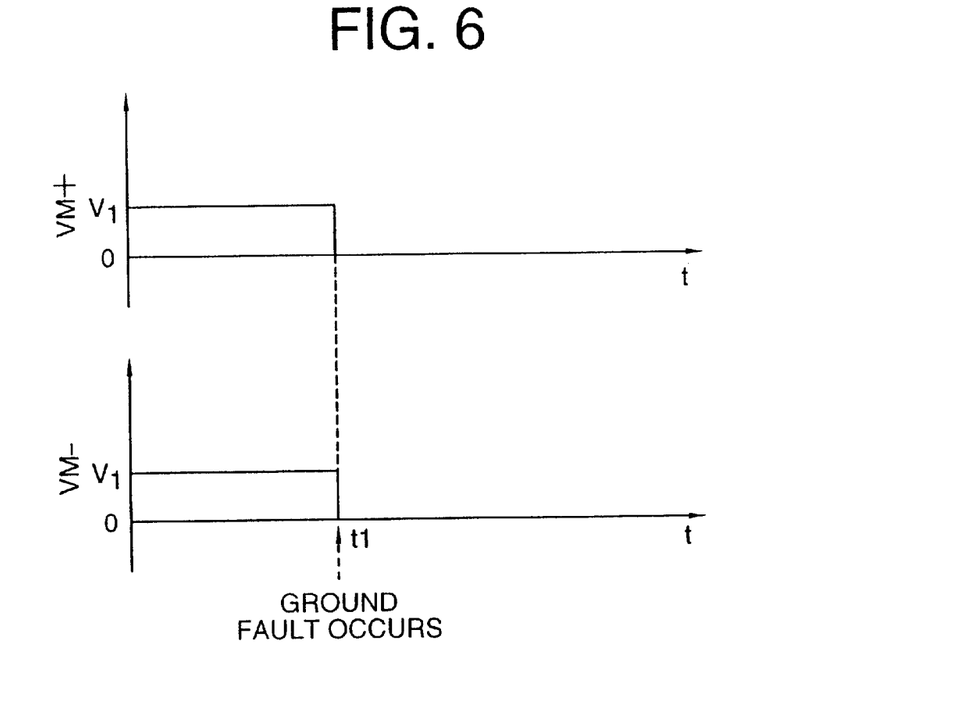
FIG. 6 illustrates the waveforms of various parts when a ground fault has occurred on the motor.

When a ground fault occurs on the power lines connected to the motor 1, the back electromotive force is zero volts, and the motor terminal voltages VM+ and VM− vary as shown in FIG. 6 if the MOSFETs 12a–12d are all turned off. That is, if V1 is the voltages applied to the respective motor terminals via predetermined resistances from the motor terminal voltage detecting circuit 13 and a ground fault occurs at time t1, the VM+ and VM− both drop to the ground potential.

This is because the armature resistance Ra of the motor 1 is usually very small and the voltage drop across the positive and negative terminals can be neglected independently of which of the positive and negative terminals of the motor 1 is short-circuited to the ground.

Figure 7:
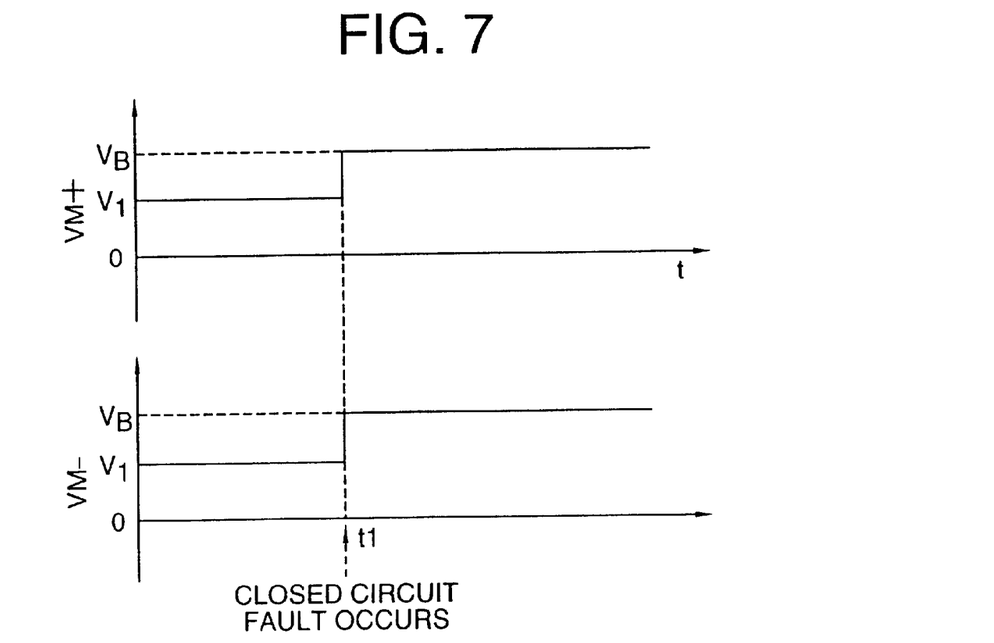
FIG. 7 illustrates the waveforms of various parts when a closed circuit fault has occurred on the motor.

When a closed circuit fault occurs on the power lines of the motor, the VM+ and VM− vary as shown in FIG. 7. That is, just as in the case of a ground fault, the voltage drop across the positive and negative terminals of the motor 1 can be ignored and the VM+ and VM− increase to the power supply voltage VB.

The comparison of the waveforms shows that the VM+ and VM− vary in phase with each other when a closed circuit fault or a ground fault occurs, and out of phase with each other when a back electromotive force is generated. In other words, if a line fault is assumed to have occurred when both VM+ and VM− are higher or lower than predetermined values, then changes in motor terminal voltages due to a back electromotive force can be distinguished from those due to a closed circuit fault or a ground fault. This way of assuming a line fault prevents a false detection of line fault caused by a back electromotive force.

The operation of the motor terminal voltage detecting circuits 13P and 13N according to Embodiment 1 will be described. The vi and vo of the motor terminal voltage detecting circuit 13 are related as follows:

$$vo = \frac{R1 \cdot R2 \cdot vi + R2 \cdot R3 \cdot Vcc}{R1 \cdot R2 + R2 \cdot R3 + R3 \cdot R1} \cdot \frac{1}{1 + \frac{R1 \cdot R2 \cdot R3}{R1 \cdot R2 + R2 \cdot R3 + R3 \cdot R1} \cdot Cs}$$

Where s is Laplace operator, and Vcc is a constant voltage.

From Equation (1), it is clear that vo is given by dividing vi or the terminal voltage of the motor 1 into a ratio (R1R2)/(R1R2+R2R3+R3R1), then adding (R2R3Vcc)/(R1R2+R2R3+R3R1), and finally, multiplying by a first order delay of the time constant, τ={(R1R2R3)/(R1R2+R2R3+R3R1)}C.

Since the motor 1 is pulse-driven, the motor terminal voltages contain high frequency noise superimposed thereon. As in the present embodiment, a false detection due to the noise can be prevented by inputting the motor terminal voltages into the microcomputer 9 via a first order delay circuit, i.e., a low-pass filter formed of resistors R1, R2, and R3, and a capacitor C.

By adding a predetermined voltage Vcc(R1/R2) to the motor terminal voltages of the motor 1, a ground fault that occurs on the motor 1 when the MOSFETs 12a −12d are OFF can be detected in terms of changes in terminal voltage.

Figure 8:
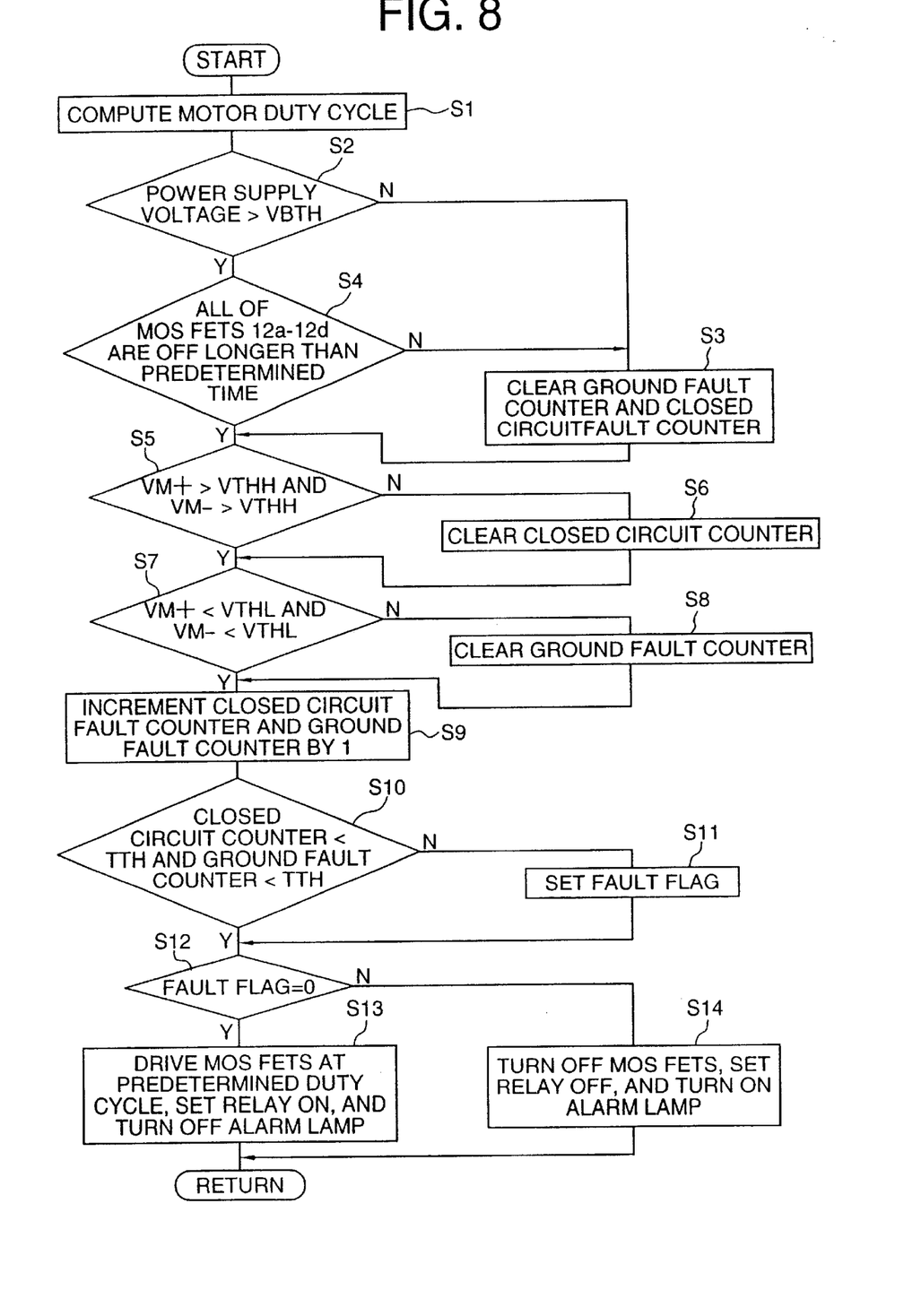
FIG. 8 is a flow chart illustrating the fault detecting operation according to Embodiment 1 of the invention.

The operation of the line fault detecting program stored in the ROM 20 will be described with reference to a flow chart shown in FIG. 8. The timer 22 calls the procedure shown in FIG. 8 at predetermined time intervals.

At step S1, the duty cycle for driving the motor 1 is computed primarily on the basis of the output signals of the torque sensor 7, vehicle speed sensor 8, and motor current detecting circuit 3.

At steps S2–S4, a line fault detection operation is inhibited. When the parasitic diodes of the MOSFETs 12 are not reverse-biased, even if the MOSFETs 12 are OFF, there is a possibility of the parasitic diodes conducting so that the motor terminal voltages VM+ and VM− behave as if a closed circuit fault or a ground fault has occurred on the power lines for the motor 1. Therefore, when the power supply voltage VB for the motor drive circuit 2 is equal to or less than a predetermined value, the operation of determining a line fault must be inhibited.

Thus, at step S2, a check is made to determine whether the power supply voltage of the motor drive circuit 2 detected by the power supply voltage detecting circuit 17 is equal to or less than a predetermined value VBTH. If the detected power supply voltage≦VBTH, then a fault duration counter is cleared at step S3. This counter has been initially set to zero after the CPU 19 is reset upon power-on. When the motor 1 is being energized, both VM+ and VM− become higher or lower than predetermined values. This condition is a criterion in the present embodiment to assume that a line fault has occurred and therefore the detection of line fault needs to be inhibited. For example, referring to FIG. 2, in the single PWM drive method, the VM+ is less than the ground potential and VM− is at the ground potential when the MOSFET 12a is OFF. Referring to FIG. 3, in the intermittent current mode of the double PWM drive method, both VM+ and VM− reach a potential of about VB/2 when the MOS-FETs 12a and 12d are OFF.

These changes in voltage are due to the regenerative current I2, and the detection of line fault should therefore be performed a sufficient time after the motor 1 has been stopped. The time should be long enough for at least the regenerative current to be dissipated. Thus, at step S4, a check is made to determine whether all of the MOSFETs 12a–12d have been OFF longer than a predetermined time length. If any one of the MOSFETs 12a–12d is ON, then the line fault duration counter is cleared at step S3. At step S13, which will be described later, if the target current is zero, then all of the MOSFETs 12a–12d are turned off.

Subsequently, at steps S5–S11, a check is made to determine whether a line fault has occurred. At step S5, a check is made to determine whether both VM+ and VM− are higher than a predetermined value VTHH. If VM+≦VTHH or VM−≦VTHH, the closed circuit fault determining counter is cleared at step S6.

Then at step S7, a check is made to determine whether both VM+ and VM− are lower than a predetermined value VTHL. If VM+≧VTHL or VM−≧VTHL, the ground fault determining counter is cleared at step S8.

Finally, at step S9, both the closed circuit fault determining counter and the ground fault determining counter are incremented by one. At step 10, a check is made to determine whether the contents of the closed circuit fault determining counter and the ground fault determining counter, after having counted up or cleared, are equal to or larger than a predetermined value TTH, i.e., whether a closed circuit fault or a ground fault has lasted longer than a predetermined time. If the content is larger than the TTH, then a fault flag is set at step S11.

The value TTH should be sufficiently long so that a false detection is prevented when a non-recursive (non-repetitive) fault condition occurs due to, for example, noise, but sufficiently short (e.g. several hundreds ms) so that a true line fault can be detected before the circuit condition becomes fatal.

The fault flag is reset to zero after the CPU 19 is reset upon power-on. Once the fault flag is set to "1", the fault flag remains "1" till the microcomputer 9 is again reset.

At step S12–S14, the motor 1, power supply relay 16, and alarm lamp 18 are driven on the basis of the above-described determination results. At step S12, a check is made to determine whether the fault flag has been set. If the fault flag is "0", the electric power steering apparatus is allowed to normally operate at step S13. In other words, the motor 1 is driven at the duty cycle computed at step S1, the power supply relay 16 is set to the ON-position, and the alarm lamp 18 is turned off.

If the fault flag has been set to "1", all of the MOSFETs 12 are turned off at step S14 and the fail-safe operation is performed to prevent the burn-out of the MOSFETs 12 which may occur if the MOSFETs 12 are energized when a closed circuit fault or a ground fault has occurred on the power lines connected to the motor 1. In addition, the power supply relay 16 is turned off, thereby interrupting excessive current which may flow in the motor drive circuit 2 if a short circuit fault occurs on the MOSFETs 12. Then, the alarm lamp 18 is turned on to warn the driver.

Serious faults such as a closed circuit fault and a ground fault must be detected immediately after the fault has occurred, so as to perform a fail-safe operation promptly. For an electric power steering apparatus, it is desirable to perform a detection of fault while the motor 1 is OFF. Vehicles are considered to run straight most of the time when they are cruising and therefore the power steering apparatus does not operate and the motor 1 is not energized. For this reason, it is preferable that a closed circuit fault and a ground fault are detected when the motor drive circuit 2 is OFF and subsequently the fail-safe operation is performed.

This is also true from a point of view that the motor drive circuit 2 should be protected from burn-out. Embodiment 1 allows detection of line faults such as a closed circuit fault or a ground fault of the power lines connected to the motor 1 or a short circuit fault of the MOSFETs 12 before the motor drive circuit 2 receives electric power, thereby eliminating a false detection due to the back electromotive force of the motor 1.

Embodiment 2:

In the aforementioned Embodiment 1, the detection of line fault is effected only when the motor 1 is not driven. However, if the outputs of the motor drive circuit 2 has a high duty cycle with the motor 1 driven, the detection of line fault can be performed without being affected by the back electromotive force. Referring to FIGS. 2 and 3, if the outputs of the motor drive circuit 2 have a high duty cycle, the difference in average voltage between the VM+ and VM− is sufficiently large in normal operation. This large difference distinguishes the normal operation from a closed circuit fault or a ground fault where the VM+ and VM− change in the same direction.

Thus, when the motor 1 is driven by the motor drive circuit 2 whose outputs have a higher duty cycle, a line fault can be assumed to have occurred if both VM+ and VM− become higher or lower than predetermined values similarly to the above Embodiment 1.

In this case, if the time constant τ of the first order delay of the motor terminal voltage detecting circuit 13 is selected to be long compared to the period of the PWM carrier wave but short enough for preventing too slow a detection which can cause a fatal result, then the motor terminal voltages of a square shape due to PWM can be smoothed out and the average voltage can be checked to determine whether a line fault has occurred.

In order to reduce noise, the frequency of the PWM carrier wave is usually set to, for example, 20 kHz, higher than audible frequencies. Thus, it is a very heavy load for the microcomputer 9 to perform a sampling operation of the terminal voltages of the motor 1 which is being driven by pulses. However, use of a PWM carrier wave higher than audible frequencies allows the terminal voltages of the motor 1 to be sampled at a period (e.g., several milliseconds) longer than that of the PWM carrier wave, thereby alleviating the load on the microcomputer 9.

Figure 9:
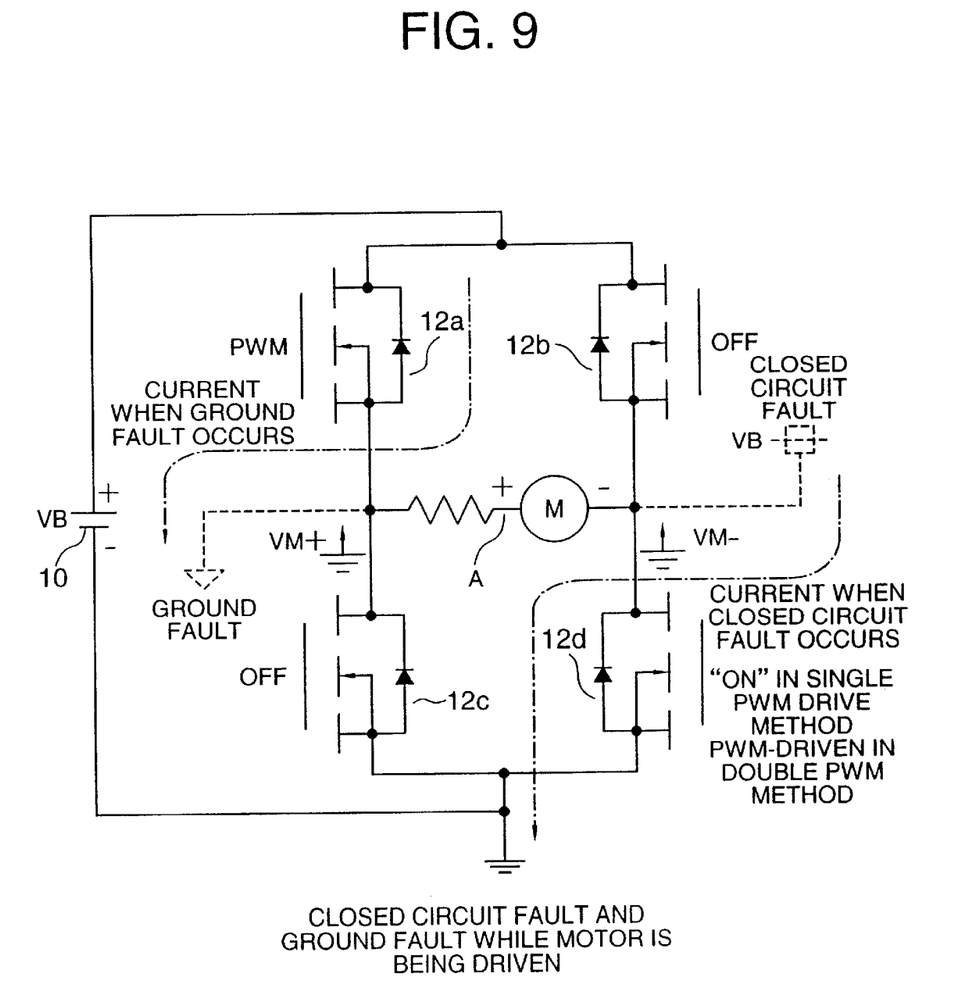
FIG. 9 illustrates the operation when a closed circuit fault or a ground fault occurs during the energization of the motor.

FIG. 9 illustrates the operation-when a closed circuit fault and a ground fault occur during the energization of the motor 1. The operation assumes that the MOSFET 12a is PWM-driven, the MOSFETs 12b and 12c are turned off, and the MOSFET 12d is turned on in the single PWM drive method and is PWM-driven in the double PWM drive method. Referring to FIG. 9, the behavior of the circuit will be described with respect to a closed circuit fault of the negative terminal of the motor drive circuit 2 and a case of ground fault of the positive terminal of the motor drive circuit 2.

When a closed circuit fault occurs on the negative terminal of the motor drive circuit 2 in the single PWM drive method, excessive current flows through the MOSFET 12d with the result that the drain-to-source voltage of the MOSFET 12d increases and the VM− increases to a voltage close to the power supply voltage VB.

With electric power steering apparatuses, the motor current is usually feedback-controlled, so that when the motor current decreases due to increases in the VM+, the microcomputer 9 operates to increase the current of the motor 1 by increasing the duty cycle for driving the MOSFET 12a.

Then, the duty cycle of the output of the motor drive circuit 2 increases to 100% while at the same time the VM− also increases to a voltage close to the power supply voltage VB. Therefore, when the output of the motor drive circuit 2 has a duty cycle higher than a predetermined value, a closed circuit fault can be assumed to have occurred if both VM+ and VM− are higher than predetermined values. Also in the double PWM drive method, the drive duty cycle of the MOSFET 12d increases to 100% due to the aforementioned current feedback control, thus providing the same effect as in the single PWM drive method.

Meanwhile, when a ground fault occurs on the negative terminal of the motor drive circuit 2 with the motor 1 driven in the single PWM drive method, the VM+ becomes the ground potential and the current through the MOSFET 12a flows into a point of the ground fault but not into the motor 1, so that the aforementioned current feedback control increases the duty cycle of the output of the motor drive circuit 2. The VM− is at the ground potential since the MOSFET 12d is ON.

Thus, when the duty cycle of the output of the motor drive circuit 2 is higher than a predetermined value, a ground fault can be assumed to have occurred if the VM+ and VM− are both less than predetermined values. Also in the double PWM drive method, the drive duty cycle of the MOSFET 12d increases to 100% due to the aforementioned current feedback control, thus providing the same effect as in the single PWM drive method.

In Embodiment 2, a line fault is not assumed to have occurred if a difference in potential between the VM+ and VM− is greater than a predetermined value. Thus, when the motor 1 is being driven as shown in FIG. 9, if a closed circuit fault occurs on the positive terminal of the motor 1 or a ground fault occurs on the negative terminal of the motor 1, the line fault cannot be detected. However, when a closed circuit fault occurs on the positive terminal, the MOSFETs 12 will not burn out since a current flows through the motor 1, which is a load on the MOSFETs 12. Moreover, the line fault causes too large a current to flow through the motor 1, thereby increasing the auxiliary steering force excessively. Therefore, the torque sensor 7 detects less steering force so t hat the microcomputer 9 stops the auxiliary steering operation, that is, the microcomputer 9 causes all of the MOSFETs 12 to turn off to stop supplying electric power to the motor 1, thereby preventing a fatal result. When a ground fault occurs on the negative terminal, the power steering apparatus operates normally in the singe PWM drive method, and operates the same way as in the single PWM drive method if operated in the double PWM drive method, preventing a serious result. On the other hand, there are some locations in the circuit where the motor current detecting circuit 3 detects a current resulting from a line fault even though no current flows through the motor 1. In response to the detection of the current resulting from the line fault, the aforementioned current feedback control causes the duty cycle of the output of the motor drive circuit 2 to decrease, thereby establishing required conditions for inhibiting the detection of line fault. Thus, a line fault may not be detected properly.

For example, if a ground fault occurs on a point A in FIG. 9, the VM+ and VM− both decrease to potentials close to the ground but the motor current detecting circuit 3 detects a current and the motor drive circuit 2 decreases the duty cycle of its output correspondingly. Thus, a line fault cannot be detected. However, the decrease in the duty cycle of the output of the motor drive circuit 2 caused by the current feedback control prevents the MOSFETs 12 from burning out. Further, excessive current due to a line fault (short circuit current) can be used to assume a line fault.

As mentioned above, in such a very fatal fault as the MOSFETs 12 burn out, there is no case where the required conditions of inhibiting the line fault detecting operation based on the duty cycle of the output of the motor drive circuit 2 are established. Therefore, it can be assumed that the provision of required conditions of inhibiting the line fault detecting operation will not impair the ability of the apparatus to detect a line fault. It is just enough if the fault modes shown in FIG. 9 can be detected when the motor 1 is being driven. The detecting method of Embodiment 1 can be combined with Embodiment 2 so that a fault detecting operation can be performed after the motor drive circuit 2 is turned off in order to detect line faults that cannot be detected during the energization of the motor 1.

Figure 10:
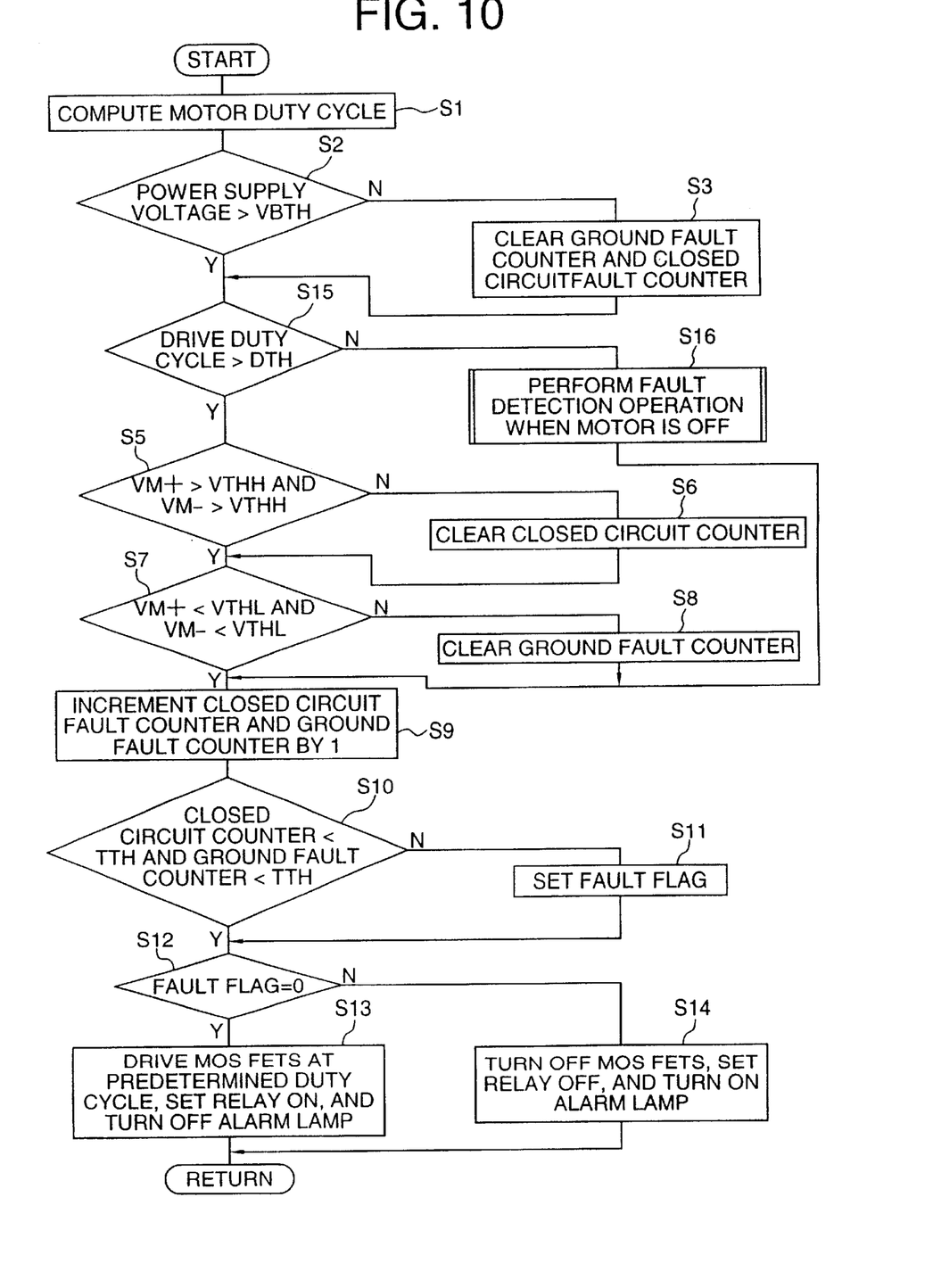
FIG. 10 is a flow chart illustrating the fault detecting operation of Embodiment 2 of the invention.

Next, the operation of a fault detecting program stored in the ROM 20 will be described with reference to the flow chart in FIG. 10. Steps same as or similar to those in the flow chart representing the operation of Embodiment 1 have been given the same references. The procedure shown in FIG. 10 is called at predetermined time intervals.

At step S1, the duty cycle at which the motor 1 is driven is computed primarily on the basis of the signals outputted from the torque sensor 7, vehicle speed sensor 8, and motor current detecting circuit 3. At steps S2 and S3, the line fault detecting operation is inhibited. Up to these steps, the operation is the same as Embodiment 1.

At step S15, a check is made to determine whether the duty cycle for driving the motor 1 is higher than a predetermined value DTH. If the drive duty cycle is equal to or lower than DTH, then the line fault detecting operation is performed at step S16 when the motor 1 is OFF just like steps S4–S8 of Embodiment 1. If the drive duty cycle is higher than DTH, then the line fault detecting operation is performed at steps S5–S11. Finally, at steps S12–S14, the motor 1, power supply relay 16, and alarm lamp 18 are driven.

As described above, in this embodiment, a line fault can be detected with the motor 1 driven, both in the single PWM drive method and in the double PWM drive method.

Embodiment 3:

As is clear from FIG. 2, it is when the motor current is relatively small that the motor current flows intermittently and the VM+ and VM− change in the same direction. Thus, in Embodiment 2, a fault can still be detected if the line fault detecting operation is performed only when the target current or detected current of the motor 1 is higher than a predetermined value.

Embodiment 4:

When a closed circuit fault or a ground fault occurs on the lines connected to the motor 1, the terminals of the motor 1 are short-circuited via parasitic diodes of the MOSFETs 12. When the motor 1 is short-circuited, the motor 1 generates a brake force (generator brake) proportional to the rotational speed of the motor 1. Thus, this type of fault causes more steering force with increasing steering speed. Embodiment 4 will be described with respect to a case where the generator brake is prevented when a line fault occurs.

Figure 11:
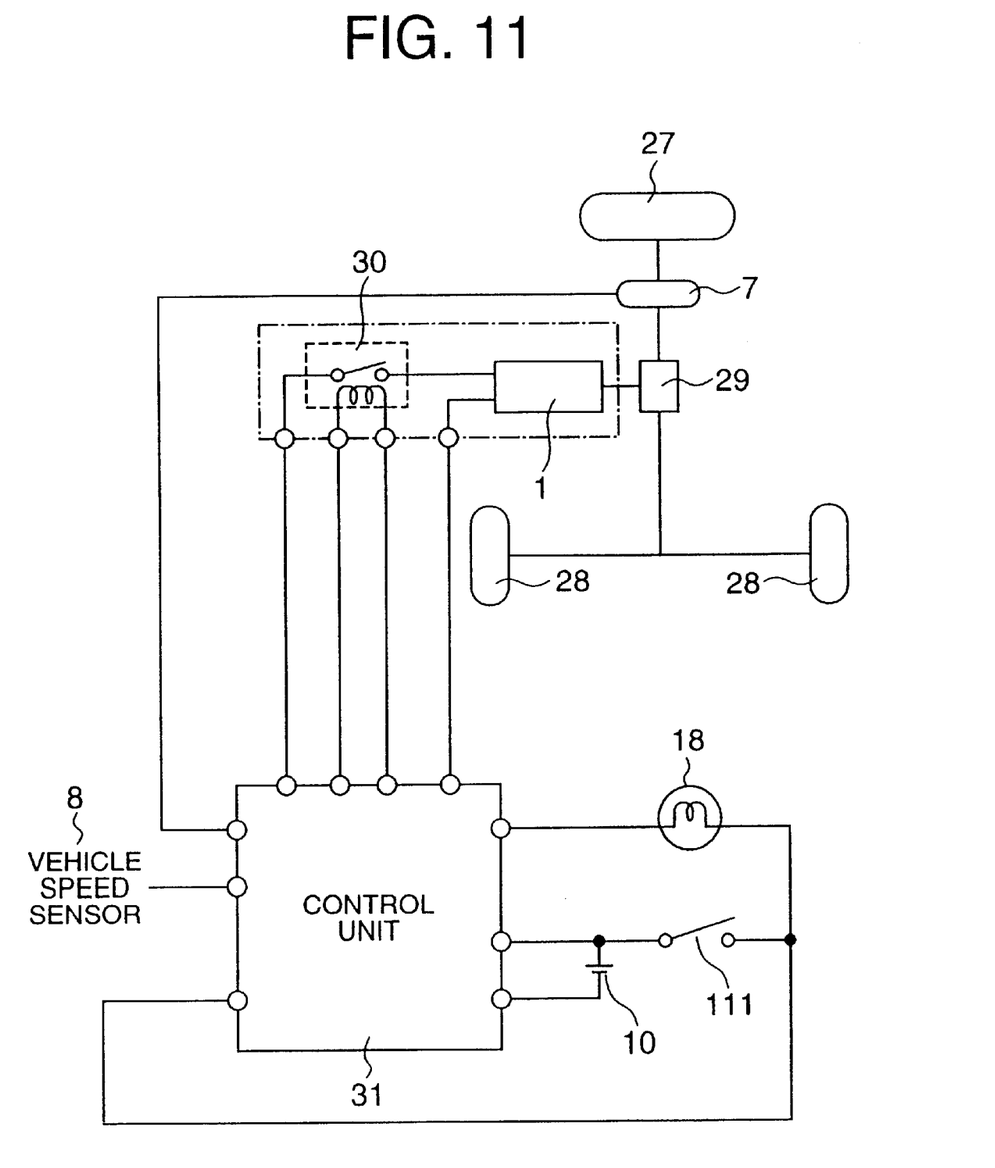
FIG. 11 illustrates an electric power steering apparatus according to Embodiment 4 of the invention.

FIG. 11 illustrates a general construction of Embodiment 4. Elements similar to or the same as those of Embodiment 1 or the conventional apparatus have been given the same references and description thereof is omitted. Referring to FIG. 11, numeral 27 denotes a steering wheel, numeral 28 denotes tires. Numeral 29 denotes a transmission for transmitting the output torque of the motor 1 to a steering system. Numeral 30 denotes a motor relay inserted in a closed circuit formed of the motor drive circuit 2 and the motor 1, and numeral 31 is the control unit of an electric power steering apparatus. FIG. 11 has the same circuit configuration as FIG. 1.

The operation will be described. In the normal operation, the control unit 31 causes the motor 1 to output an auxiliary steering torque in accordance with the vehicle speed signal and the steering torque detected by the torque sensor 7 so that the driver can operate the steering wheel 27 with a reasonable steering force. The output torque of the motor 1 is transmitted to the steering system via the transmission 29.

Further, a line fault of the motor 1 is detected by the methods shown in Embodiments 1–3. It is inhibited to drive the motor 1. The power supply relay 16 built in the control unit 31 is opened, and the alarm lamp 18 warns the driver. In addition to the aforementioned fail-safe procedure, a motor relay 30 is provided in a closed circuit formed of the motor drive circuit 2 and the motor 1. The motor relay 30 is opened when a line fault has been detected, so that the generator brake of the motor 1 is prevented during the fault.

The aforementioned fail-safe procedure is maintained till the microcomputer 9 in the control unit 31 is again reset.

The motor relay 30 may be provided within the control unit 31. However, assembling the motor 1 and motor relay 30 in an integral unit as in the present embodiment can prevent the generator brake of the motor 1 resulting from a short circuit fault of the power lines which may occur between the motor 1 and the control unit 31.

Embodiment 5:

The clutch 5 may, of course, be used in place of the motor relay 30 in Embodiment 4 for the same advantages as in the conventional apparatus.

Embodiment 6:

Although the embodiments have been described only with respect to an electric power steering apparatus using a DC motor, when a DC brushless motor is used instead of the DC motor, line faults can be detected by the aforementioned techniques for similar advantages if a monitor circuit is provided for monitoring the voltages of the respective phases.

Industrial Applicability

As mentioned above, with the electric power steering apparatus according to the present invention, a motor provides an auxiliary steering force in accordance with, for example, the steering torque. If the terminal voltages of the motor are lower or higher than predetermined values, a line fault is assumed to have occurred. Thus, the invention eliminates chances of a false detection due to the back electromotive force of the motor, lending itself to the detection of a closed circuit fault or a ground fault of the power lines connected to the motor.

What is claimed is:

1. An electric power steering apparatus, comprising:
a motor having a first terminal and a second terminal and producing an auxiliary steering force primarily in accordance with a detected steering torque;
a motor drive circuit for controllably driving said motor; and
a fault determining means for determining whether a fault has occurred by comparing a first terminal voltage of the first terminal and a second terminal voltage of the second terminal to a predetermined value, wherein said fault determining means determines a fault when the first and second terminal voltages of the first and second terminals of said motor are greater than said predetermined value, or when a sum of a predetermined voltage added to the first terminal voltage of the first terminal and a sum of the predetermined voltage added to the second terminal voltage of the second terminal are less than said predetermined value.

2. The electric power steering apparatus according to claim 1, wherein said fault determining means further comprises a motor terminal average voltage monitor which detects average voltages on said first and second motor terminals by smoothing out a square-shape of said first and second terminal voltages appearing on said first and second terminals of said motor, and said fault determining means determines that a fault has occurred by comparing the average voltages to said predetermined value.

3. The electric power steering apparatus according to claim 1, wherein said fault determining means comprises first and second motor terminal voltage detectors which are connected to the first and second terminals, respectively, of said motor, and which add the predetermined voltage to said first and second terminal voltages of said first and second terminals of said motor so that a ground fault of said motor can be detected.

4. The electric power steering apparatus according claim 1, wherein a fault detection operation is performed on the basis of the first and second terminal voltages of said motor only when said motor is not driven longer than a predetermined time length.

5. The electric power steering apparatus according to claim 1, wherein a fault detection operation is not performed on the basis of the first and second terminal voltages of said motor when said motor is being driven and voltages applied to said motor are lower than predetermined values.

6. The electric power steering apparatus according to claim 1, wherein a fault detection operation is not performed on the basis of the first and second terminal voltages of said motor when said motor is being driven and a motor current supplied to said motor is lower than a predetermined value.

7. The electric power steering apparatus according to claim 1, wherein a fault detection operation is performed on the basis of the first and second terminal voltages of said motor only when a power supply voltage of said motor drive/control means is within a predetermined range.

8. The electric power steering apparatus according to claim 1, wherein energization of said motor is stopped when it is determined that a fault has occurred.

9. The electric power steering apparatus according to claim 1, further includes an alarm device which warns a driver when it is determined that a fault has occurred.

10. The electric power steering apparatus according to claim 1, further including a switch means provided between the motor drive/control means and the power supply or between the motor drive/control means and the ground, the switch means disconnecting the motor drive/control means from the power supply or from the ground when it is determined that a fault has occurred.

11. The electric power steering apparatus according to claim 1, further including a switch means in a closed circuit formed of the motor drive/control means and a load, the switch means being opened when it is determined that a fault has occurred.

12. The electric power steering apparatus according to claim 1, further including a clutch means which couples said motor and a steering system to transmit a driving force from said motor to the steering system, the clutch means mechanically disconnecting said motor from the steering system when it is determined that a fault has occurred.

13. The electric power steering apparatus according to claim 3, each of said first and second fault determining circuits each comprises a first resistor, a second resistor, and a third resistor, wherein said first, second and third resistors are connected to each other at common junction, said first resistor is connected to a constant voltage source, said second resistor is connected to ground, and said third resistor is connected to one of said first and second terminals.

14. The electric power steering apparatus according to claim 13, wherein each of said first and second fault determining circuits further comprises a capacitor connected to said first, second and third resistors at said common junction, wherein said capacitor and said first, second and third resistors form a low pass filter for providing a first order delay to said first and second terminal voltages of said first and second terminals of said motor to prevent false detection of a fault due to high frequency noise imposed on said first and second terminal voltages of said first and second terminals.

* * * * *